United States Patent [19]

Cole et al.

[11] Patent Number: 5,398,720

[45] Date of Patent: Mar. 21, 1995

[54] FAUCET STRAINER

[75] Inventors: Raymond W. Cole, Lakeville; David C. Popielski, South Bend, both of Ind.

[73] Assignee: Bristol Corporation, Bristol, Ind.

[21] Appl. No.: 215,055

[22] Filed: Mar. 21, 1994

[51] Int. Cl.⁶ .............................................. F03B 3/18
[52] U.S. Cl. .................................... 137/545; 137/360
[58] Field of Search ....................... 137/545, 546, 360; 251/223, 225

[56] References Cited

U.S. PATENT DOCUMENTS

| | | | |
|---|---|---|---|
| 1,018,514 | 2/1912 | Miller | 137/545 |
| 2,418,381 | 4/1947 | Wegmann | 137/545 |
| 3,929,317 | 12/1975 | Cohn et al. | 251/223 |
| 4,478,617 | 10/1984 | Rees | 137/545 |

FOREIGN PATENT DOCUMENTS 223063  10/1924  United Kingdom ................ 137/545

Primary Examiner—A. Michael Chambers
Attorney, Agent, or Firm—James D. Hall

[57] ABSTRACT

A faucet strainer for preventing debris carried by a dispensed fluid from clogging or jamming the faucet assembly. The faucet strainer includes a strainer body and a debris receptacle. The strainer body includes a straining mechanism which allows fluid to pass therethrough but prevents debris carried by the fluid from passing therethrough. The debris receptacle, which is disposed along a fluid dispensing flow path downstream of the straining mechanism, collects the fluid carried debris prevented from passing through the straining mechanism.

16 Claims, 1 Drawing Sheet

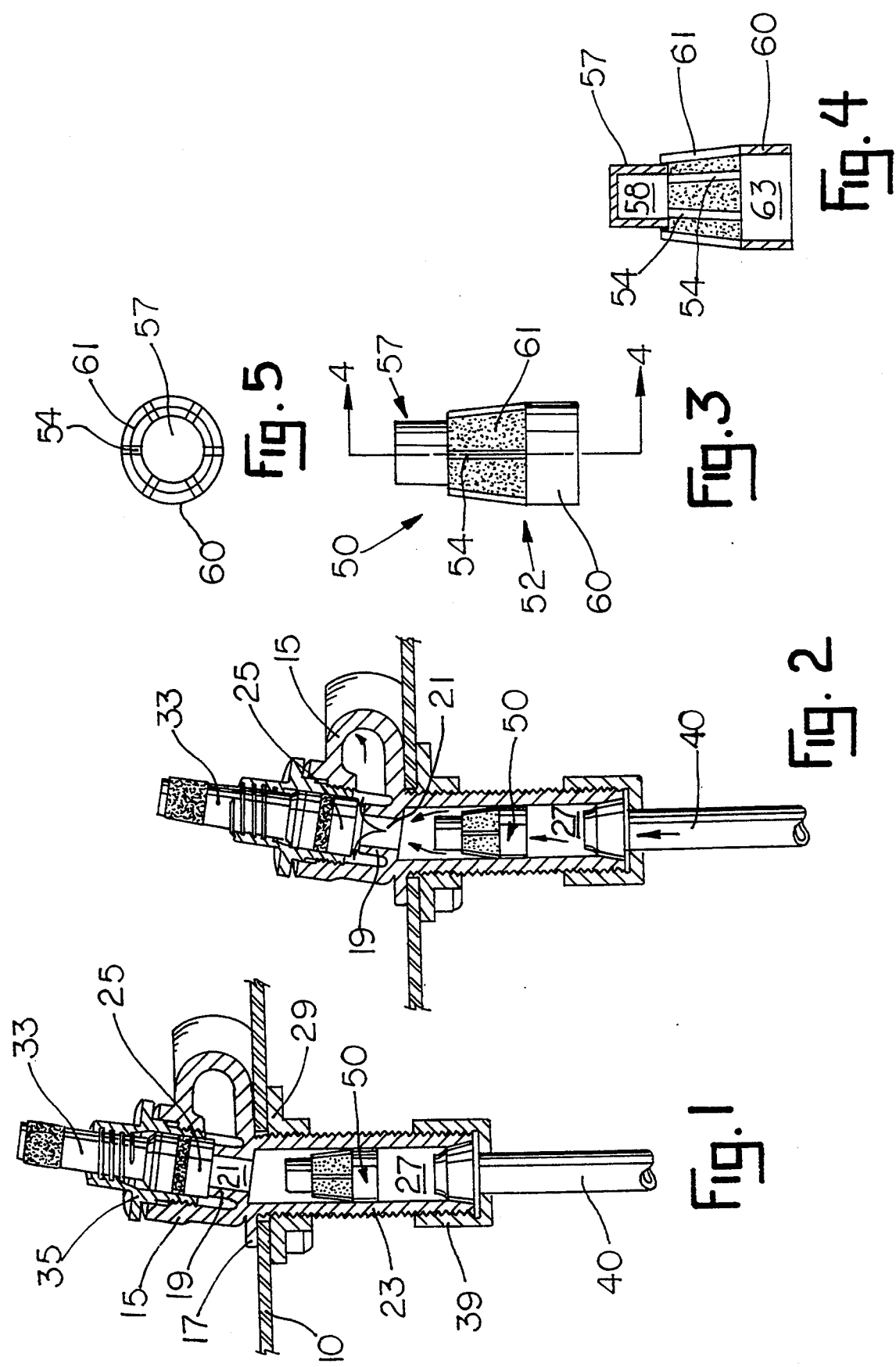

1

FAUCET STRAINER

BACKGROUND OF THE INVENTION

This invention pertains to a strainer in a faucet assembly, and, in particular, to a faucet strainer which prevents debris contained within fluid supply conduits from impairing the fluid dispensing function of the faucet assembly.

One shortcoming of many faucet assemblies relates to the susceptibility of these assemblies to jam, clog or otherwise become inoperational due to debris within the conduits through which the fluid introduced to the faucet assemblies is transported, For instance, during building of a structure which includes the installation of faucet assemblies, it is not uncommon for debris such as sawdust to enter and be trapped within the water source lines or conduits. This debris problem is particularly prevalent in the mobile home and recreational vehicle industry due to the manner in which these structures are fabricated. When the faucet assembly is subsequently turned on, the sawdust is transported along with the water and eventually reaches the valve assembly. While the water may flow through the valve assembly and out the faucet spout, the sawdust can clog the valve assembly or possibly become lodged or jammed within the valve assembly, thereby preventing a user from turning the faucet on or off. Consequently, many of these faucet assemblies are returned to the manufacturer and claimed to be defective, whereas the problem actually results from the interference of the water carried debris. Thus, it is desirable to provide a faucet assembly, and more particularly a faucet strainer, which reduces the likelihood of faucet assembly malfunction caused by debris carried by the dispensed fluid.

SUMMARY OF THE INVENTION

In one form thereof, the faucet strainer of the present invention is for use with a faucet assembly having a valve and includes a strainer with a body and a debris receptacle. The strainer body includes a straining means for allowing a fluid to pass therethrough while preventing debris carried by the fluid from passing therethrough. The receptacle, which is disposed along a fluid dispensing flow path downstream of the straining means, is for collecting the fluid carried debris which does not pass through the straining means.

In another form thereof, the faucet strainer of the present invention is for use with a faucet assembly including a valve having a valve closure, wherein the valve closure is fluidly connected to a fluid source by a fluid conduit which defines a fluid dispensing flow path. The faucet strainer includes a strainer body and a debris receptacle. The strainer body is operationally positionable within the fluid conduit and along the fluid dispensing flow path upstream of the faucet assembly valve closure. The strainer body includes straining means for allowing the fluid to pass therethrough and preventing debris carried by the fluid to pass therethrough. The receptacle, which is disposed along the fluid dispensing flow path downstream of the straining means and upstream of the valve closure, is for collecting the fluid carried debris which does not pass through the straining means.

An advantage of the faucet strainer of the present invention is that it prevents debris transported within the fluid conduits from clogging or jamming a faucet assembly. Another advantage of the present invention is that the faucet strainer can be retrofit in previously manufactured or installed faucet assemblies. Other advantages of the present invention will become apparent from the following description.

BRIEF DESCRIPTION OF THE DRAWINGS

FIG. 1 shows a partial sectional view primarily of the valve portion of a faucet assembly wherein portions of the valve body and bonnet have been removed for purposes of illustration, wherein the valve is closed, and wherein the faucet strainer of the present invention is operationally positioned.

FIG. 2 shows the faucet assembly of FIG. 1 wherein the valve is open.

FIG. 3 is an enlarged side view of the faucet strainer used in FIG. 1 removed from the faucet assembly.

FIG. 4 is a longitudinal sectional view of the faucet strainer taken along line 4—4 of FIG. 3.

FIG. 5 is a top view of the faucet strainer of FIG. 3.

Corresponding reference characters indicate corresponding parts throughout the several figures.

DESCRIPTION OF THE PREFERRED EMBODIMENT

The preferred embodiment illustrated is not intended to be exhaustive or to limit the invention to the precise form disclosed. The embodiment was chosen and described in order to best explain the principles of the invention and its application and practical use to thereby enable others skilled in the art to best utilize the invention.

Referring to FIG. 1, the preferred faucet strainer of the present invention, generally designated 50, is shown in its operational position inserted within a faucet assembly. While selected portions of the faucet assembly related to the operation of faucet strainer 50 are shown and briefly described herein, other and more detailed aspects of the faucet assembly are known in the art, for example as shown and described in U.S. Pat. No. 3,929,317 which is explicitly incorporated herein by reference and will be referred to herein.

The faucet assembly represented in FIG. 1 includes valve body 15 formed with a mounting flange 17 positioned flush against the horizontal flange 10 of a sink or other surface upon which the faucet assembly is installed. Valve body 15 is formed with an upwardly extending valve seat 19 which defines a cylindrical passageway that serves as an inlet 21 for fluid flow through the valve. As shown in FIG. 1, when the valve is closed, valve closure 25 is received by and sealingly engages valve seat 19 to prevent the flow of fluid through inlet 21. Valve closure 25 is mounted on the lower end of threaded stem 33, which is carried within a valve bonnet 35 threadedly connected to valve body 15. Valve body 15 also includes downwardly extending projection 23, which is externally threaded and which is formed with an axial cylindrical bore 27 which opens at its upward end into fluid inlet 21. Securing nut 29 is turned upon projection 23 and is brought into contact with the underside of flange 10 to secure valve body 15 to the sink. Tubing or piping 40, which is in fluid communication with a source of fluid (not shown) such as a water tank, is connected to the lower threaded end of projection 23 by means of nut 39.

FIG. 1 illustrates the valve when in the closed position, wherein threaded stem 33 has been rotated by a user via a handle (not shown) such that valve closure 25 sealingly engages valve seat 19 to thereby prevent fluid flow. As shown in FIG. 2, when threaded stem 33 is rotated to open the valve, valve closure 25 shifts out of sealing engagement with valve seat 19 to provide a gap therebetween. A continuous fluid conduit connecting the fluid source with the faucet assembly outlet results. The flow path which the fluid travels is indicated by the arrows in FIG. 2. During this travel, the fluid from the fluid source passes through tubing 40, through axial bore 27 and faucet strainer 50 as described more fully below, through inlet 21, through the area between valve seat 19 and valve closure 25, and on to the faucet assembly outlet such as a spout.

As shown in FIGS. 1 and 2, faucet strainer 50 is disposed along the fluid flow path upstream of valve closure 25 at a location within projection 23. Faucet strainer 50 is preferably forced fitted into projection 23 such that strainer 50 frictionally engages the interior surface of axial bore 27 so as to remain axially stationary during faucet assembly use.

Referring now to FIGS. 3-5, faucet strainer 50 is preferably formed in one piece from a corrosion resistant material such as acetal. Strainer 50 includes a strainer body 52 and a debris receptacle 57. As shown in FIG. 2, when operationally disposed within the fluid dispensing flow path, strainer body 52 is disposed upstream of debris receptacle 57. Strainer body 52 includes annular mounting extension 60 and frustoconically shaped straining or filtering section 61. Strainer body 52 preferably spans the entire diameter of axial bore 27 such that all the fluid passing through bore 27 must also pass through faucet strainer 50, thereby preventing any debris particles from slipping past strainer 50 along its outer radial sides and into the valve. While structured to frictionally contact and engage the interior surface of axial bore 27, mounting extension 60 could also be structured to mount strainer 50 in other manners, for example with a tongue and groove connection between extension 60 and the bore interior surfaces.

Six longitudinally extending elongated slots 54 are formed in straining section 61 and are disposed at 60° intervals around its circumference. Debris receptacle 57 is integrally formed with the downstream end of straining section 61 and projects downstream therefrom. As best shown in FIG. 4, strainer body 52 has a hollow interior 63, and debris receptacle 57 has a hollow interior chamber 58 which is cylindrical in shape.

The six elongated slots 54 preferably extend the entire longitudinal length of straining section 61, i.e. proximate annular extension 60 to proximate debris receptacle 57. In order to better ensure a proper fluid flow through the faucet assembly, slots 54 are sized in conjunction with the fluid flow area which exists between valve closure 25 and valve seat 19 when the valve is opened. Slots 54 in the aggregate preferably define an open area for fluid passage through faucet strainer 50 at least two times as large as the fluid flow area which exists between valve closure 25 and valve seat 19 when the valve is fully opened. This slot formation allows sufficient fluid flow even if some of the slots become clogged during operation. The actual area dimensions of each individual slot 54 are preferably smaller than the full open valve fluid flow area between valve closure 25 and valve seat 19 and should be sufficiently restricting so as to prevent any debris such as wood chips, which is within the fluid delivered by tubing 40 and which is capable of jamming the valve, from passing through faucet strainer 50 and into the valve. It will be appreciated that the actual number and size of the slots is variable by the manufacturer, and could be as few in number as one if such a slot was both sufficiently debris restrictive and large enough to allow adequate fluid flow therethrough.

The structure of faucet strainer 50 will be further understood in view of the following description of its operation. When the faucet assembly is turned on to dispense fluid such as water, the fluid passes from tubing 40 into the upstream regions of axial bore 27 and then into faucet strainer hollow interior 63. The fluid itself proceeds to pass through slots 54 within straining section 61 and eventually out the faucet spout as described above. The debris particles, larger in physical size than other impurities of the fluid, are concurrently carried by the fluid into hollow interior 63. However, because they are too large to pass through slots 54, the debris continues downstream within faucet strainer 50 until they enter the hollow interior 58 of receptacle 57 where they are collected. Receptacle 57 is preferably made large or deep enough to collect all the debris typically found trapped within fluid supply conduits such that the accumulated collected debris does not extend upstream into hollow interior 63 to block any of slots 54. However, because of the extra slot area preferably provided as described above, even if such overfill of receptacle 57 occurs and some slots 54 are partially blocked, faucet strainer 50 still allows adequate fluid to pass therethrough. It will be appreciated that over time the debris, such as wood chips, collected within receptacle 57 may eventually break down and be harmlessly flushed out of the faucet assembly.

While this invention has been described as having a preferred design, the present invention may be further modified within the spirit and scope of this disclosure and the appended claims. For instance, the elongated slots could be replaced with other shaped apertures which provide adequate fluid flow and filtering characteristics. In addition, while the preferred embodiment is described as an insert into an existing valve projection, which is advantageous from the standpoint that existing faucet assemblies can be retrofit without modification, the faucet strainer could be made integral with the valve. Furthermore, it is within the scope of the invention to change the shapes and sizes of the filtering and receptacle sections of the strainer. This application is therefore intended to cover any variations, uses, or adaptations of the invention using its general principles. Further, this application is intended to cover such departures from the present disclosure as come within known or customary practice in the art to which this invention pertains.

What is claimed is:

1. A faucet strainer for use with a faucet assembly including a valve, the faucet strainer comprising:

a strainer body comprising straining means for allowing a fluid to pass therethrough and preventing debris carried by the fluid to pass therethrough; and receptacle means carried by said strainer body and disposed along a fluid dispensing flow path downstream of said straining means but communicating with fluid and the debris carried thereby upstream of said straining means, said receptacle means defining a chamber for collecting said debris prevented from passing through said straining means.

2. The faucet strainer of claim 1 wherein said straining means comprises at least one aperture within said strainer body.

3. The faucet strainer of claim 2 wherein said at least one aperture comprises at least one elongated slot which longitudinally extends along the fluid dispensing flow path.

4. The faucet strainer of claim 3 wherein said at least one elongated slot consists of six slots circumferentially spaced around said strainer body at 60° intervals.

5. The faucet strainer of claim 2 wherein the faucet assembly valve includes a valve seat which is sealingly engaged by a shiftable valve closure, said valve closure being shiftable away from said valve seat into an open position defining an open area between said valve seat and valve closure, wherein said at least one aperture defines an opening through which fluid passes, said open area being at least two times larger than said open area between the valve closure and the valve seat when the valve is in its open position.

6. The faucet strainer of claim 1 wherein at least a portion of said strainer body is frustoconical in shape.

7. The faucet strainer of claim 1 wherein the faucet assembly valve includes a projection having an interior surface defining an interior passageway, and wherein said strainer body further comprises a mounting means for engaging said passageway interior surface.

8. The faucet strainer of claim 7 wherein said mounting means comprises an annular extension of said strainer body disposed along the fluid dispensing flow path upstream of said straining means, said annular extension structured to frictionally engage said passageway interior surface.

9. The faucet strainer of claim 1 wherein said strainer body and said receptacle are of a one-piece construction.

10. The faucet strainer of claim 1 wherein said receptacle defines a generally cylindrical collecting volume.

11. A faucet strainer for use with a faucet assembly including a valve having a valve closure, wherein the valve closure is adapted for connection to a fluid source by a fluid conduit which defines a fluid dispensing flow path, the faucet strainer comprising:

a strainer body for positioning within the fluid conduit and along the fluid dispensing flow path upstream of the faucet assembly valve closure, said strainer body comprising straining means for allowing the fluid to pass therethrough and preventing debris carried by the fluid to pass therethrough; and a receptacle means carried by said strainer body and disposed along the fluid dispensing flow path and in communication with fluid upstream of said straining means, said receptacle means defining a chamber for collecting said debris prevented from passing through said straining means.

12. A faucet strainer and a faucet assembly including a valve adapted for fluid communication with a fluid source via a fluid conduit, wherein the fluid conduit defines a fluid dispensing flow path, the faucet strainer comprising:

a strainer body and a debris receptacle both disposed within the fluid conduit, wherein said strainer body includes straining means for allowing the fluid to pass therethrough and preventing debris carried by the fluid to pass therethrough, said debris receptacle connected to said strainer body and disposed along the fluid dispensing flow path downstream of said strainer body and in communication with fluid upstream of said straining means, said receptacle including a chamber for collecting the fluid carried debris prevented from passing through said straining means.

13. The combination of claim 12, wherein said straining means includes a plurality of elongated slots which longitudinally extend along the fluid dispensing flow path.

14. The combination of claim 12 wherein at least a portion of said strainer body is frustoconical in shape.

15. The combination of claim 12 wherein the fluid conduit includes a projection of said valve having an interior surface defining an axial bore, and wherein said strainer body further comprises a mounting means for engaging said axial bore interior surface.

16. The combination of claim 15 wherein said mounting means includes an annular extension of said strainer body disposed along the fluid dispensing flow path upstream of said straining means.

* * * * *